US012615099B2

(12) United States Patent
Li et al.

(10) Patent No.: US 12,615,099 B2
(45) Date of Patent: Apr. 28, 2026

(54) RADIO RESOURCE MANAGEMENT REQUIREMENTS FOR UNIFIED TRANSMISSION CONFIGURATION INDICATOR FRAMEWORK

(71) Applicant: Intel Corporation, Santa Clara, CA (US)

(72) Inventors: Hua Li, Arlington, VA (US); Meng Zhang, Beijing (CN); Andrey Chervyakov, Nizhny Novgorod (RU); Rui Huang, Beijing (CN); Ilya Bolotin, Nizhny-Novgorod (RU)

(73) Assignee: Intel Corporation, Santa Clara, CA (US)

( * ) Notice: Subject to any disclaimer, the term of this patent is extended or adjusted under 35 U.S.C. 154(b) by 267 days.

(21) Appl. No.: 18/289,983

(22) PCT Filed: Aug. 4, 2022

(86) PCT No.: PCT/US2022/039361
§ 371 (c)(1),
(2) Date: Nov. 8, 2023

(87) PCT Pub. No.: WO2023/014847
PCT Pub. Date: Feb. 9, 2023

(65) Prior Publication Data
US 2024/0380504 A1 Nov. 14, 2024

Related U.S. Application Data

(60) Provisional application No. 63/270,471, filed on Oct. 21, 2021, provisional application No. 63/230,570, filed on Aug. 6, 2021.

(51) Int. Cl.
*H04B 17/364* (2015.01)
*H04B 17/318* (2015.01)

(52) U.S. Cl.
CPC ......... *H04B 17/364* (2015.01); *H04B 17/328* (2023.05)

(58) Field of Classification Search
CPC ........................... H04B 17/364; H04B 17/328
See application file for complete search history.

(56) References Cited

U.S. PATENT DOCUMENTS

| | | | | |
|---|---|---|---|---|
| 2021/0185647 A1* | 6/2021 | Rahman | ................ | H04W 72/23 |
| 2022/0369301 A1* | 11/2022 | Zhou | ..................... | H04L 5/0035 |
| 2023/0089752 A1* | 3/2023 | Raghavan | ............. | H04W 24/10 |
| | | | | 370/329 |

FOREIGN PATENT DOCUMENTS

| | | | | |
|---|---|---|---|---|
| WO | WO-2018232090 A1 | 12/2018 | | |
| WO | WO-2020205802 A1 * | 10/2020 | ......... | H04B 7/06958 |
| WO | WO-2023014847 A1 | 2/2023 | | |

OTHER PUBLICATIONS

"Enhancements on Multi-beam Operation", ZTE, R1-2100285, 3GPP TSG RAN WG1 Meeting #104-e, (Jan. 19, 2021).
(Continued)

*Primary Examiner* — Samina F Choudhry
(74) *Attorney, Agent, or Firm* — Schwegman Lundberg & Woessner, P.A.

(57) ABSTRACT

An apparatus and system for a unified transmission configuration indicator (TCI) state switch requirement are described. Both radio resource management and TCI state switch delay requirements are described. The UL TCI state switch delay requirement may depend on whether a downlink (DL) reference signal (RS) associated with the UL TCI state satisfies known conditions, as well as whether a joint or separate TCI mode is being used. In the separate TCI mode, the delay requirement may include timing between a DL data transmission and acknowledgement, and also include a time for receive beam refinement in frequency range2. In the joint TCI mode, the UL and DL TCI state
(Continued)

switch delay requirement—due may be the same or may be the same as the separate TCI mode.

20 Claims, 5 Drawing Sheets

(56)                    References Cited

OTHER PUBLICATIONS

"Enhancements on Multi-beam Operation", ZTE, R1-2104585, 3GPP TSG RAN WG1 Meeting #105-e, (May 12, 2021).
"Enhancements to Multi-Beam Operation", Intel Corporation, R1-2104888, 3GPP TSG RAN WG1 Meeting #105-e, (May 12, 2021).
"Impact to RRM requirements for further enhancements on MIMO", Samsung, R4-2109837, 3GPP TSG RAN WG4 Meeting #99-e, (May 11, 2021).
"International Application Serial No. PCT/US2022/039361, International Search Report mailed Nov. 15, 2022", 3 pgs.
"International Application Serial No. PCT/US2022/039361, Written Opinion mailed Nov. 15, 2022", 3 pgs.
"International Application Serial No. PCT US2022 039361, International Preliminary Report on Patentability mailed Feb. 15, 2024", 5 pgs.

* cited by examiner

200

202

224

Processor

Software

204

224

Main Memory

Software

206

224

Static Memory

Software

220

Network Interface Device

208

Link

210

Video Display

212

Alphanumeric Input Device

214

U Navigation Device

216

Storage Device

222

Machine-Readable Medium

Software

224

218

Signal Generation Device

Transmission Medium 226

TCI 0: CSI-RS 64

TCI 0: CSI-RS 65

TCI 12: SSB 0

TCI 13: SSB 1

TCI 14: SSB 2

RADIO RESOURCE MANAGEMENT REQUIREMENTS FOR UNIFIED TRANSMISSION CONFIGURATION INDICATOR FRAMEWORK

PRIORITY CLAIM

This application is a U.S. National Stage Filing under 35 U.S.C. 371 from International Application No. PCT/US2022/039361, filed Aug. 4, 2022 and published in English as WO 2023/014847 on Feb. 9, 2023, which claims the benefit of priority to U.S. Provisional Patent Application Ser. No. 63/230,570, filed Aug. 6, 2021, U.S. Provisional Patent Application Ser. No. 63/270,471, filed Oct. 21, 2021, each of which is incorporated herein by reference in its entirety.

TECHNICAL FIELD

Embodiments pertain to next generation (NG) wireless communications. In particular, some embodiments relate to radio resource management (RRM) requirements for a transmission configuration indicator (TCI).

BACKGROUND

The use and complexity of next generation (NG) or new radio (NR) wireless systems, which include 5G networks and are starting to include sixth generation (6G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology, including complexities related to multiple input multiple output (MIMO) communications.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes.

Portions and features of some embodiments may be included in, or substituted for, those of other embodiments. Embodiments set forth in the claims encompass all available equivalents of those claims.

Figure 1A:
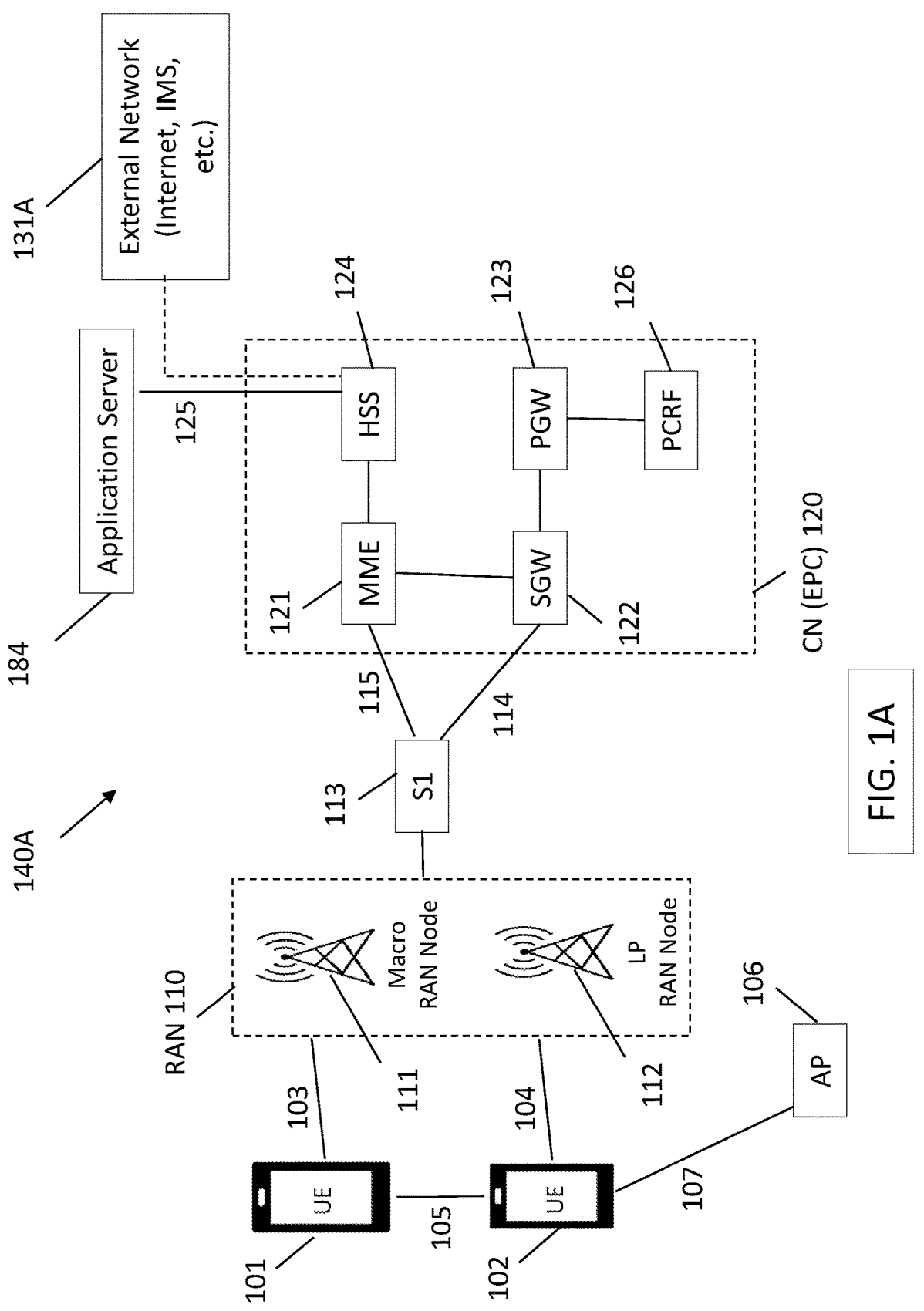
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G and later generation functions. Accordingly, although 5G will be referred to, it is to be understood that this is to extend as able to 6G (and later) structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IOT) UE or a Cellular IoT (CIOT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IOT (eNB-IOT) UE and Further Enhanced (FeNB-IOT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as 6th generation NodeBs—and thus may be alternately referred to as Radio Access Network node (RANnode).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and fronthaul (F) F1 interface. The E1 interface may be between a CU control plane (gNB-CU-CP) and the CU user plane (gNB-CU-UP) and thus may support the exchange of signaling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signaling connection and UE-associated services that are related to a single UE and are associated with a UE-associated signaling connection that is maintained for the UE.

The F1 interface may be disposed between the CU and the DU. The CU may control the operation of the DU over the F1 interface. As the signaling in the gNB is split into control plane and user plane signaling, the F1 interface may be split into the F1-C interface for control plane signaling between the gNB-DU and the gNB-CU-CP, and the F1-U interface for user plane signaling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
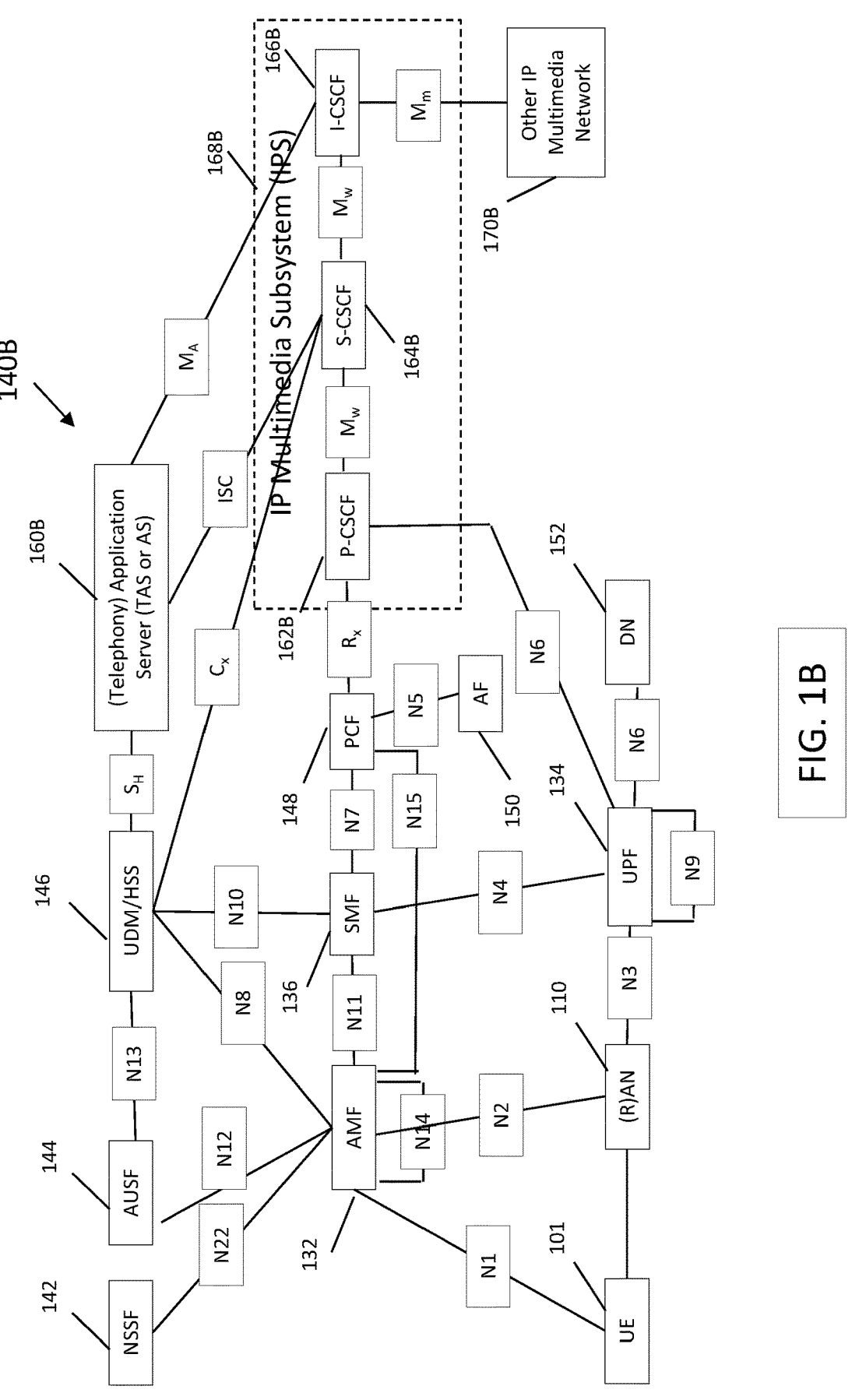
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
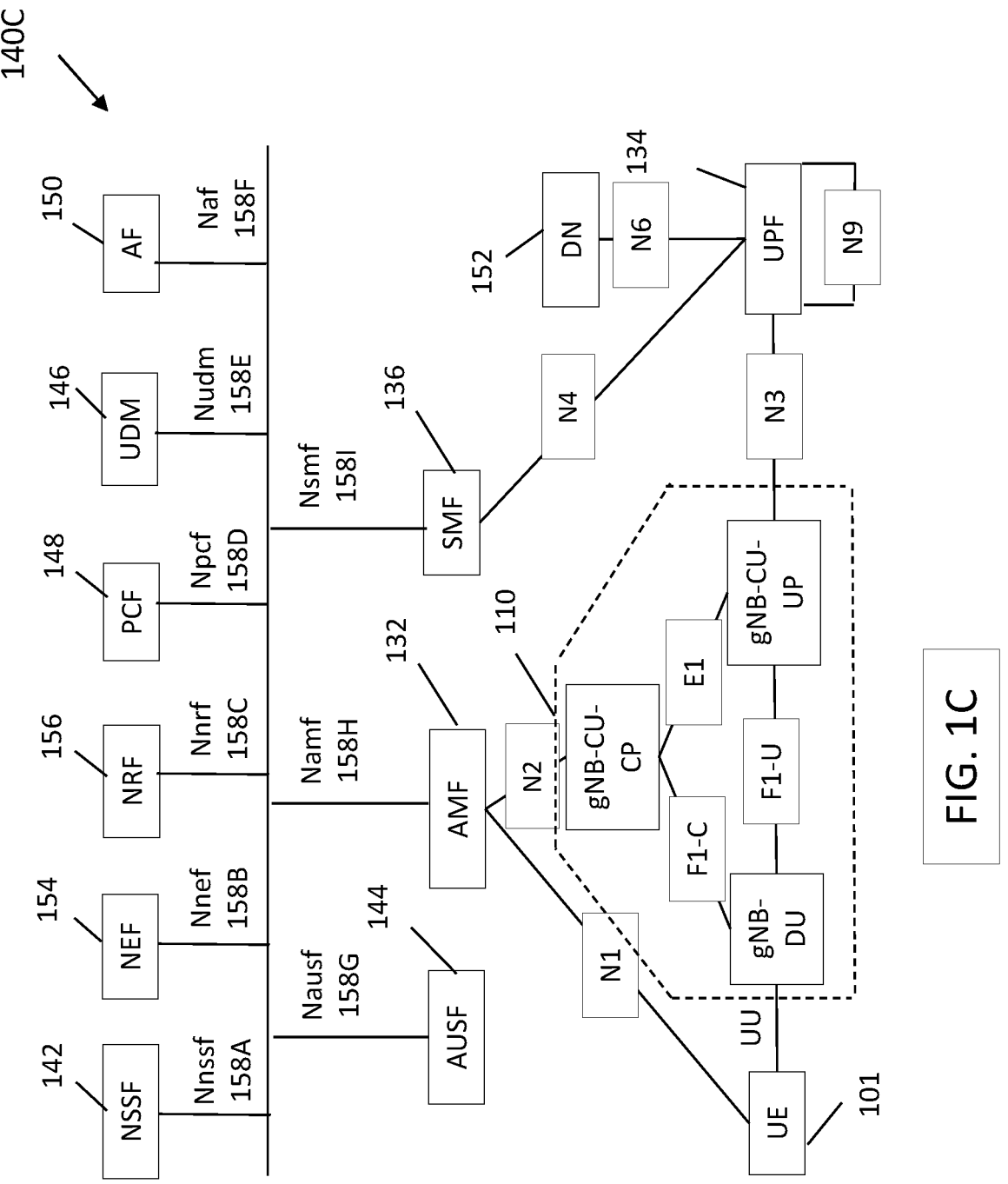
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
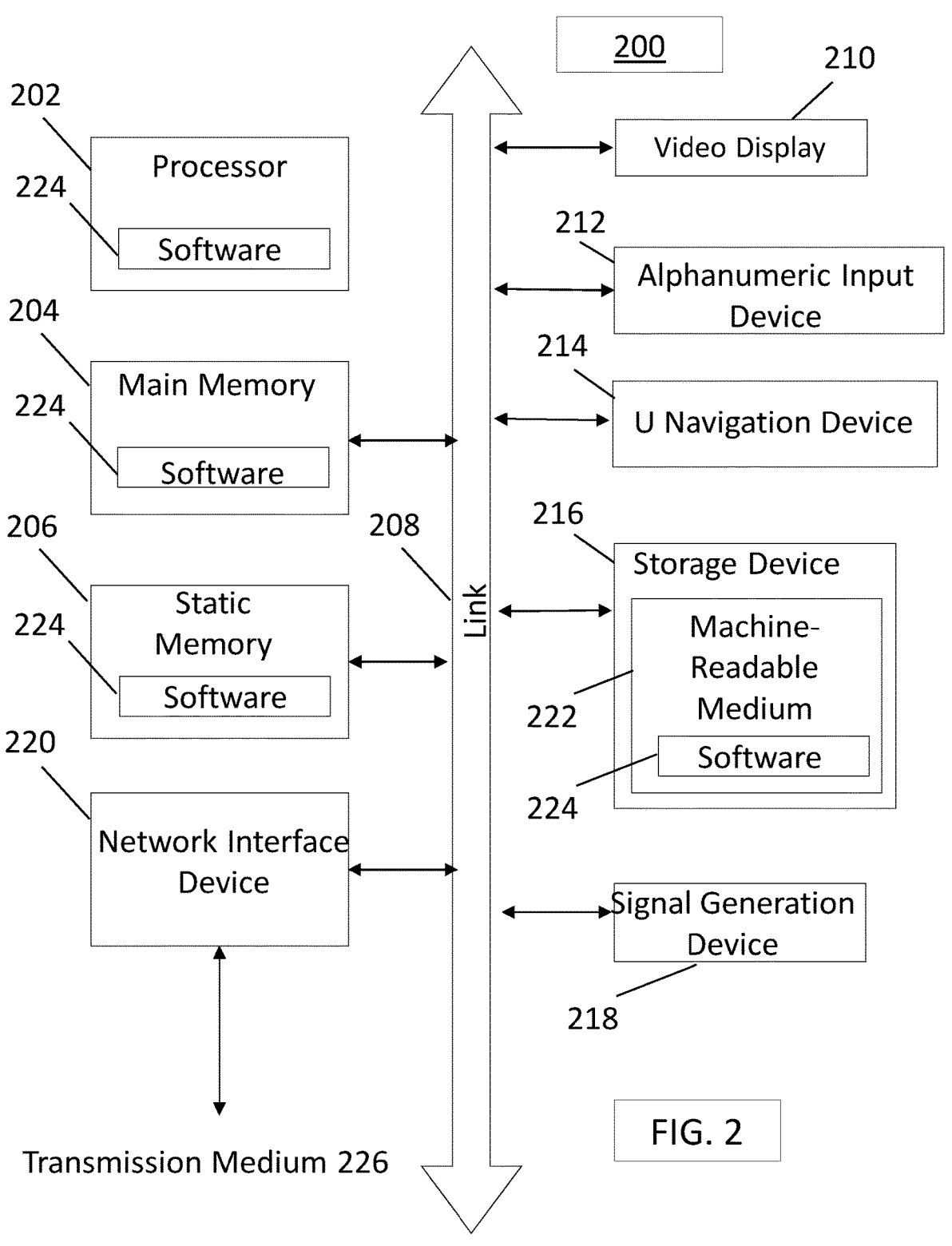
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth (r), Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHZ)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHZ and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHZ, 1710-2025 MHz, 2110-2200 MHz, 2300-2400 MHZ, 2.4-2.4835 GHz (note: it is an ISM band with global availability and it is used by Wi-Fi technology family (11b/g/n/ax) and also by Bluetooth), 2500-2690 MHz, 698-790 MHZ, 610-790 MHz, 3400-3600 MHZ, 3400-3800 MHZ, 3800-4200 MHz, 3.55-3.7 GHZ (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHZ, 3800-4200 MHZ, 3.5 GHz bands, 700 MHz bands, bands within the 24.25-86 GHz range, etc.), spectrum made available under FCC's "Spectrum Frontier" 5G initiative (including 27.5-28.35 GHZ, 29.1-29.25 GHZ, 31-31.3 GHZ, 37-38.6 GHZ, 38.6-40 GHz, 42-42.5 GHZ, 57-64 GHz, 71-76 GHZ, 81-86 GHz and 92-94 GHZ, etc), the ITS (Intelligent Transport Systems) band of 5.9 GHZ (typically 5.85-5.925 GHZ) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHZ) and WiGig Band 4 (63.72-65.88 GHZ), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHZ, and future bands including 94-300 GHz and above. Furthermore, the scheme can be used on a secondary basis on bands such as the TV White Space bands (typically below 790 MHz)

where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., lowithmedium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

Figure 3:
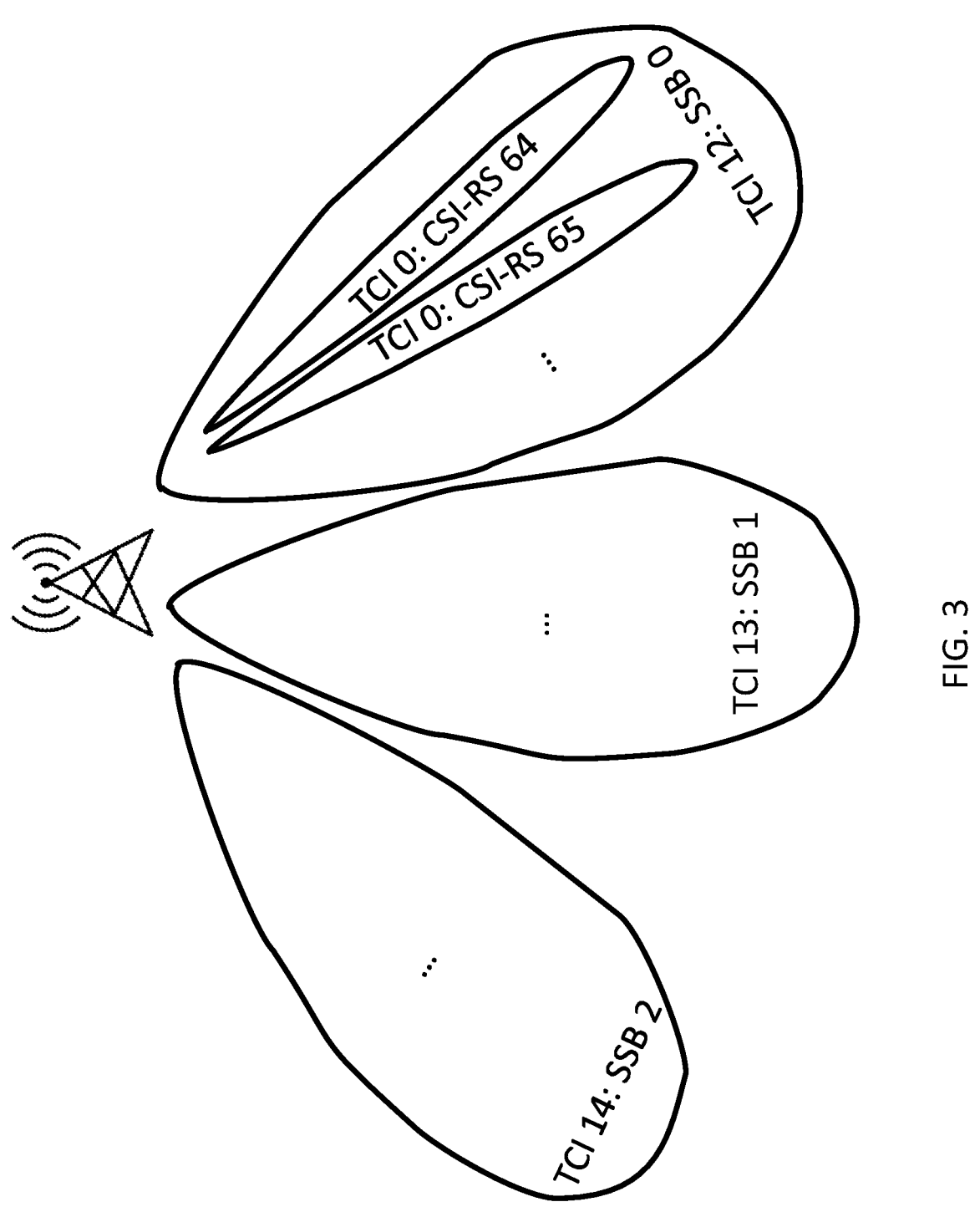
FIG. 3 illustrates a TCI scheme in accordance with some embodiments.

As above, with the advent of enhanced UE architectures, the use of MIMO communications, e.g., between the UE and gNB and between UEs, has become increasingly prevalent. This has led to further enhancements in MIMO (FeMIMO) to management of beamforming and beamsteering and reduce associated overheads. To this end, FeMIMO aims to extend 3GPP specification support in the following areas targeting frequency range2 (FR2) (24.25 GHz to 52.6 GHz) and FR1 (4.1 GHz to 7.125 GHZ): multi-beam operation, support for multi-transmission/reception point (TRP) deployment, sounding reference signal (SRS), and channel state information (CSI) measurement and reporting. Among the objectives, RAN4 will focus on multiple issues, including a unified TCI framework for downlink (DL) and uplink (UL) transmissions, layer1/layer2 (L1/L2)-centric inter-cell mobility, and a beam indication signaling medium. FIG. 3 illustrates a TCI scheme in accordance with some embodiments.

TCI states (also called beams) are dynamically sent over in a downlink control information (DCI) message that includes configurations such as quasi-colocation (QCL) relationships between the DL reference signals (RSs) in one channel state information reference signal (CSI-RS) set and physical downlink shared channel (PDSCH) demodulation reference signal (DMRS) ports. That is, a beam for a target channel/signal (e.g., PDSCH, PDCCH, CSI-RS) to be received by the UE can be indicated by a TCI. The TCI includes the source RS and an intended QCL type to be applied. For example, the gNB can provide a DCI scheduling a PDSCH to the UE, where the DCI can select a TCI to be used for reception of the PDSCH. The UE can set analog beamforming coefficients based on the indicated TCI for receiving the PDSCH. Since the indicated TCI is intended only for the PDSCH reception, it can be regarded as a separate TCI framework. Different signaling may be defined and used for a beam indication for a physical downlink control channel (PDCCH) (or CSI-RS), which may be independent of the PDSCH signaling.

A UE can be configured with a list of up to "M" TCI-State configurations within the higher layer (RRC ReConfig) information element PDSCHConfig to decode the PDSCH according to a detected PDCCH with a DCI intended for the UE and the serving cell. M depends on the UE capability maxNumberActiveTCI-PerBWP. Each TCI State contains parameters for configuring a QCL relationship between one or two downlink reference signals and the DMRS ports of the PDSCH, the DMRS port of PDCCH or the CSI-RS port(s) of a CSI-RS resource. The QCL relationship is configured by the higher layer (RRC Reconfig) parameter qcl-Type1 for the first DL RS, and qcl-Type2 for the second DL RS. A maximum two QCL-types per TCI state can be configured.

Unified TCI for DL and UL

In some cases, one (or only a few) beam directions may be used to provide communications between the UE and the gNB. This may render extraneous the continuous setting of individual communication channels, each with a beam indication referring mostly to the same beam reference. FeMIMO may thus include a multi-beam operation employing a common beam for data and control transmission/reception for DL and UL communications. The common beam (TCI state) may be associated with multiple channels/signals in Rel-17 (e.g., CSI-RS and PDSCH/SRS and PUSCH) and may be indicated among one unified common TCI pool pre-configured by a higher-layer signaling.

In some cases, the TCI state pool may be a joint TCI state pool, which is indicated by RRC signaling to be applicable for multiple DL/UL channels jointly. Alternatively, separate DL and UL TCI state pools may be indicated (applicable to DL or UL channels only, respectively). Thus, there are two types of unified TCI: joint DL/UL TCI and separate DL and UL TCI. A joint TCI state pool provides efficient common beam management when overlapped TCI states are used for both DL and UL; separate TCI state pools, on the other hand, can be associated with additional UL parameters such as power control parameters.

Joint DL/UL TCI is used when there is perfect beam correspondence between DL and UL transmissions and the same beam is used for both DL and UL transmissions. A common source RS is used for determining both the DL QCL information and the UL transmitter (TX) spatial filter. Separate DL/UL TCI is used when no beam correspondence is present and different beams are used for DL and UL transmissions. The UL TCI replaces the uplink RRC parameter spatialRelationInfo, a source RS in the UL TCI provides a reference for determining the UL TX spatial filter.

For the unified TCI framework in Rel. 17, any DL RS that is a valid target DL RS of a Rel-15/16 TCI state based on the Rel-15/16 QCL rules can be configured as a target DL RS of Rel-17 DL TCI (hence the Rel-17 DL TCI state pool). This does not imply that all such DL RSs necessarily share a same TCI state. The DL RS includes a CSI-RS and DMRS for the PDSCH or PDCCH. Note that DL and UL TCI state pools may be separate or shared for separate DL/UL TCI.

For M=N=1 (M and N>1 cases are not yet defined), on Rel-17 unified TCI, for separate DL/UL TCI, one instance of a beam indication using DCI formats 1_1/1_2 (with and without DL assignment) can be used as follows: one TCI field codepoint represents a pair of DL TCI state and UL TCI state. If the DCI indicates such a TCI field codepoint, the UE applies the corresponding DL TCI state and UL TCI state;

one TCI field codepoint represents only a DL TCI state. If the DCI indicates such a TCI field codepoint, the UE applies the corresponding DL TCI state, and keeps the current UL TCI state; or one TCI field codepoint represents only an UL TCI state. If the DCI indicates such a TCI field codepoint, the UE applies the corresponding UL TCI state, and keeps the current DL TCI state.

On pathloss measurement for Rel.17 unified TCI framework, a pathloss reference signal (PL-RS) (configured for pathloss calculation) is either included in UL TCI state or (if applicable) joint TCI state or associated with UL TCI state or (if applicable) joint TCI state. One agreement is whether a UE supports "beam misalignment or not" between the DL source RS in the UL or (if applicable) joint TCI state to provide spatial relation indication and the PL-RS is a UE capability. Whether the framework is 'included in' or 'associated with' (including the manner it is performed and the signaling) is up to RAN2. The UE maintains the PL-RS of the activated UL TCI state or (if applicable) joint TCI state. The maximum number of activated UL TCI states or (if applicable) joint TCI states per band per cell is a UE capability. The PL-RS is assumed to be periodic.

The UL TCI replaces the uplink parameter spatialRelationInfo, a source RS in the UL TCI provides a reference for determining the UL TX spatial filter. The use of a RS may result in the use of a delay requirement for a UL TCI state switch. The beam of the RS is used as the reference beam direction for the UL transmission. However, the associated RS may be known or unknown. Therefore, the UL TCI state switch delay may differentiate the known/unknown condition for associated reference signal.

The known conditions for the associated DL RS are as follows: A TCI state switch command is received within 1280 ms upon the last transmission of the RS resource for beam reporting or measurement. The UE has sent at least 1 L1-reference signal received power (RSRP) report for the target TCI state before the TCI state switch command. The TCI state remains detectable during the TCI state switching period. The Synchronization Signal Block (SSB) associated with the TCI state remains detectable during the TCI switching period. The signal-to-noise ratio (SNR) of the TCI state ≥−3 dB.

When the UL signal is used as the reference beam direction, UL beam sweeping is first used by the network to find the proper beam. Then, the UL beam index is signalled to the UE and the UE can use the corresponding UL beam. If an UL RS is used, an extra UL beam sweeping delay is used for the UL TCI state switching delay.

On a pathloss measurement for Rel.17 unified TCI framework, a PL-RS (configured for pathloss calculation) is either included in the UL TCI state or (if applicable) joint TCI state or is associated with the UL TCI state or (if applicable) joint TCI state. The PL-RS may be also included. In the current RAN4 specification, the delay of PL-RS has already been considered for the Medium Access Control-Control Element (MAC CE)-based uplink spatial information switch, then the impact of the PL-RS in the UL TCI state delay requirement may also be considered. If the PL-RS is included in UL TCI state and known, the extra delay requirement for the UL TCI state is:

$$NM * \left\lceil \frac{5 * T_{target\_PL-RS} + 2 \text{ ms}}{NR \text{ slot length}} \right\rceil$$

where:

NM=1, if the target PL-RS is not maintained by the UE, 0 otherwise, and $T_{target\_PL-RS}$ is the periodicity of the target pathloss reference signal, which would be an SSB or non-zero power (NZP) CSI-RS transmission.

If either the associated DL RS or UL RS are unknown, a longer switching delay is allowed. The UE may not be required to transmit the UL signal with the target UL spatial relation until the DL RS and pathloss reference RS switch are completed.

Furthermore, for a Rel-17 DCI-based beam indication, regarding the application time of the beam indication, the first slot that is at least X ms or Y symbols after the last symbol of the acknowledgment of the joint or separate DL/UL beam indication. Therefore, the ACK/NACK time may also be considered in DCI based delay requirement.

For a joint TCI frame, a common source reference RS may be used for determining both the DL QCL information and the UL TX spatial filter. In some cases, the delay requirement can refer to the DL/UL TCI state switch respectively or a maximum delay time may be used.

As above, MAC-CE-based and MAC-CE+DCI-based beam indication schemes are supported for a unified TCI. The MAC-CE and DCI-based UL TCI state switch for unified TCI should be defined.

For a separate TCL state switch for UL transmissions, the delay can be defined as follows:
if the DL RS is unknown:

$$n + T_{HARQ} + 3N_{slot}^{subframe,\mu} + 1$$

if the DL RS is known:

$$n + T_{HARQ} + 3N_{slot}^{subframe,\mu} + T_{L1-RSRP} + 1$$

where $T_{HARQ}$ is the timing between the DL data transmission and acknowledgement as specified in 3GPP TS 38.213, and $T_{L1-RSRP}$ is the time for Rx beam refinement in FR2.

For the joint DL/UL mode (state pool), a common source RS is used for determining both the DL QCL information and the UL TX spatial filter. For a joint TCI state switching delay, two methods may be used: define a single delay requirement for both the DL/UL TCI state switch or define two delay requirements for each of the DL/UL TCI respectively, which are the same requirements as for the separate TCI case.

For the first case (method 1), if a single requirement is designed for both the DL and UL TCI state switch, the single requirement may be based on the longer delay requirement between the individual DL/UL TCI state switch. For a MAC CE-based TCI switch delay for DL and UL, the main difference lies in the fact that extra time for timing tracking may be used for the DL TCI switch when associated with a new DL-RS if the target TCI is not in the active TCI state list. While for the UL TCI switch, the timing tracking is not present and thus the associated time may be avoided. Therefore, the single delay requirement for a joint TCI based on the MAC-CE may depend on the DL TCI state switch delay, which may be longer. For a DCI-based delay requirement, the delay requirement is referred to RAN1. At present, it is unclear whether the DL or UL TCI state switch delay is longer. Therefore, defining a single delay requirement for DL and UL in a joint DCI case based on the DCI may be difficult.

For the second case (method 2), as the only difference between the joint DCI and separate TCI is whether or not the source reference RS for DL and UL is the same. This may have no impact on the delay requirement for DL and UL. Therefore, the delay requirements for DL/UL TCI state switch are the same as those defined in the separate TCI case.

Thus, the delay requirement may be defined for the DL TCI and UL TCI respectively and further differentiation between the joint TCI case and separate TCI case may not be used.

From the RAN1 the agreement, the PL-RS may be also included or associated in the Rel-17 Unified TCI framework. In current RAN4 specification, as the delay of the PL-RS has already been considered for the MAC-CE-based UL spatial information switch—the impact of PL-RS in UL TCI state or joint TCI state may be considered as well.

For the Rel-16 uplink spatial information switch, the PL-LS activation is triggered by the MAC-CE, where an extra delay is considered if the uplink spatial information switch and PL-RS activation are not in the same MAC-CE. However, if the PL-RS is included or associated in the unified TCI framework, the extra delay time can be saved.

The legacy RL-RS activation delay is defined as:

$$n + T_{HARQ} + 3N_{slot}^{subframe,\mu} + NM * \left\lceil \frac{5 * T_{target\_PL-RS} + 2 \text{ ms}}{NR \text{ slot length}} \right\rceil$$

where NM=1, if the target PL-RS is not maintained by the UE, 0 otherwise.

This shows that an extra L1-RSRP measurement is used when the PL-RS is not maintained. However, in RAN1 agreements, the UE maintains the PL-RS of the activated UL TCI state or joint TCI state. Therefore, the extra delay due to non-maintaining of the RL-RS may be incorporated in the Rel-17 unedified TCI framework design.

RAN1 also discusses the definition of alignment or mis-alignment between the PL-RS and spatial relation RS in the UL or joint TCI state.

On the pathloss measurement for the Rel. 17 unified TCI framework, at least for discussion purposes "beam alignment" is defined as the event that the PL-RS is identical to the spatial relation RS in the UL or (if applicable) joint TCI state. Any other case is defined as beam misalignment.

In previous UL spatial information switch delay discussions in Rel-16 have investigated whether the requirement will apply only for the case that the RS in PL-RS and source RS in the uplink spatial info are QCL-ed. Even though UL transmission performance degradation may occur due to the beam mismatch between the two reference signals, restraints are not used as there is no limitation in the RAN1 specification.

In Rel-17, RAN1 has identified this issue discussed the mismatch scenarios to define delay requirement for the beam alignment case first for UL or joint TCI state.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37. C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a user equipment (UE) configured for operation in a Fifth-Generation New Radio (5G NR), the apparatus comprising: processing circuitry; and memory, wherein the processing circuitry is configured to:

decode signalling comprising an uplink (UL) transmission configuration indicator (TCI) state switch command indicating to switch from an active UL TCI state to a target UL TCI state;

determine, in response to the TCI state switch command, if the target UL TCI state is known or unknown based on a downlink reference signal (DL-RS) associated with the target UL TCI state;

determine, in response to the TCI state switch command, an uplink (UL) TCI state switch delay dependent on whether the target UL TCI state is known or unknown;

switch from the active UL TCI state to the target UL TCI state within the UL TCI state switch delay; and transmit data via an uplink channel, after switching to the target UL TCI state, with the target UL TCI state.

2. The apparatus of claim 1, wherein the signalling comprising the UL TCI state switch command comprises a Medium Access Control (MAC) Control Element (MAC-CE).

3. The apparatus of claim 2, further comprising a downlink control information (DCI) format indicating the target UL TCI state.

4. The apparatus of claim 3, wherein the processing circuitry is configured to determine whether the target UL TCI state is known or unknown based, at least in part, on whether the TCI state switch command is received within 1280 ms of a last transmission of a RS resource for beam reporting or measurement.

5. The apparatus of claim 4, wherein the processing circuitry is further configured to determine whether the target UL TCI state is known or unknown based on whether:

the UE has transmitted at least one layer 1 reference signal received power (L1-RSRP) report for a target TCI state before the TCI state switch command, the target UL TCI state remains detectable during a TCI state switching period, a synchronization signaling block (SSB) associated with the UL TCI state remains detectable during the TCI state switching period, and a signal-to-noise ratio (SNR) of the UL TCI state is ≥−3 dB.

6. The apparatus of claim 4, wherein the processing circuitry is further configured to configure the UE to:

determine the UL TCI state switch delay using a PL-RS delay when a target pathloss reference signal (PL-RS) is not maintained by the UE in the target UL TCI state; and determine the UL TCI state switch delay without using the target PL-RS delay when the target UL TCI state is maintained by the UE.

7. The apparatus of claim 6, wherein the target PL-RS delay is based on a time to a first pathloss RS transmission after L1-RSRP measurement when the target TCI state is unknown and a time to first pathloss RS transmission after the MAC-CE when the target TCI state is known.

8. The apparatus of claim 6, wherein the PL-RS is one of a Synchronization Signal Block (SSB) and non-zero power (NZP) channel state information reference signal (CSI-RS) transmission.

9. The apparatus of claim 6, wherein when the target TCI state is known, the processing circuitry is further configured to complete the switch from the active UL TCI state to the target UL TCI state starting from a first slot that is at least a number of symbols after a last symbol of a physical uplink control channel (PUCCH) carrying a Hybrid Automatic Repeat reQuest Acknowledgement (HARQ-ACK) corresponding to the DCI.

10. The apparatus of claim 9, wherein after completion of the switch, the processing circuitry is to configure the UE to transmit the PUCCH carrying the HARQ-ACK.

11. A non-transitory computer-readable storage medium that stores instructions for execution by processing circuitry of a user equipment (UE) configured for operation in a Fifth-Generation New Radio (5G NR), wherein the processing circuitry is configured to:

decode signalling comprising an uplink (UL) transmission configuration indicator (TCI) state switch command indicating to switch from an active UL TCI state to a target UL TCI state;

determine, in response to the TCI state switch command, if the target UL TCI state is known or unknown based on a downlink reference signal (DL-RS) associated with the target UL TCI state;

determine, in response to the TCI state switch command, an uplink (UL) TCI state switch delay dependent on whether the target UL TCI state is known or unknown;

switch from the active UL TCI state to the target UL TCI state within the UL TCI state switch delay; and transmit data via an uplink channel, after switching to the target UL TCI state, with the target UL TCI state.

12. The non-transitory computer-readable storage medium of claim 11, wherein the signalling comprising the UL TCI state switch command comprises a Medium Access Control (MAC) Control Element (MAC-CE).

13. The non-transitory computer-readable storage medium of claim 12, further comprising a downlink control information (DCI) format indicating the target UL TCI state.

14. The non-transitory computer-readable storage medium of claim 13, wherein the processing circuitry is configured to determine whether the target UL TCI state is known or unknown based, at least in part, on whether the TCI state switch command is received within 1280 ms of a last transmission of a RS resource for beam reporting or measurement.

15. The non-transitory computer-readable storage medium of claim 14, wherein the processing circuitry is further configured to determine whether the target UL TCI state is known or unknown based on whether:

the UE has transmitted at least one layer 1 reference signal received power (L1-RSRP) report for a target TCI state before the TCI state switch command, the target UL TCI state remains detectable during a TCI state switching period, a synchronization signaling block (SSB) associated with the UL TCI state remains detectable during the TCI state switching period, and a signal-to-noise ratio (SNR) of the UL TCI state is ≥−3 dB.

16. The non-transitory computer-readable storage medium of claim 14, wherein the processing circuitry is further configured to configure the UE to:

determine the UL TCI state switch delay using a PL-RS delay when a target pathloss reference signal (PL-RS) is not maintained by the UE in the target UL TCI state; and determine the UL TCI state switch delay without using the target PL-RS delay when the target UL TCI state is maintained by the UE.

17. The non-transitory computer-readable storage medium of claim 16, wherein the target PL-RS delay is based on a time to a first pathloss RS transmission after L1-RSRP measurement when the target TCI state is unknown and a time to first pathloss RS transmission after the MAC-CE when the target TCI state is known.

18. The non-transitory computer-readable storage medium of claim 16, wherein the PL-RS is one of a Synchronization Signal Block (SSB) and non-zero power (NZP) channel state information reference signal (CSI-RS) transmission.

19. An apparatus for a generation Node B (gNB)) configured for operation in a Fifth-Generation New Radio (5G NR), the apparatus comprising: processing circuitry; and memory, wherein the processing circuitry is configured to:

encode signalling comprising an uplink (UL) transmission configuration indicator (TCI) state switch command indicating for a user equipment (UE) to switch from an active UL TCI state to a target UL TCI state;

decode data received via an uplink channel received from the UE in accordance with the target UL TCI state after the UE switches from the active UL TCI state to the target UL TCI state, wherein the UL channel is received within an UL TCI state switch delay that based on whether the target UL TCI state is known or unknown by the UE depending on a downlink reference signal (DL-RS) associated with the target UL TCI state.

20. The apparatus of claim 19, wherein the signalling comprising the UL TCI state switch command comprises a Medium Access Control (MAC) Control Element (MAC-CE).

* * * * *